(12) United States Patent
Kawaguchi et al.

(10) Patent No.: US 10,428,236 B2
(45) Date of Patent: Oct. 1, 2019

(54) POLYURETHANE UREA RESIN COMPOSITION EXHIBITING UV-ABSORPTION-AGENT RESISTANCE, MOULDED BODY USING SAID COMPOSITION, AND COATING MATERIAL

(71) Applicant: TOSOH CORPORATION, Shunan-shi (JP)

(72) Inventors: Tadayuki Kawaguchi, Yokohama (JP); Takahiro Tanaka, Yokohama (JP)

(73) Assignee: TOSOH CORPORATION, Shunan-shi (JP)

( * ) Notice: Subject to any disclaimer, the term of this patent is extended or adjusted under 35 U.S.C. 154(b) by 70 days.

(21) Appl. No.: 15/322,666

(22) PCT Filed: Jul. 6, 2015

(86) PCT No.: PCT/JP2015/069397
§ 371 (c)(1),
(2) Date: Dec. 28, 2016

(87) PCT Pub. No.: WO2016/006566
PCT Pub. Date: Jan. 14, 2016

(65) Prior Publication Data
US 2017/0130094 A1    May 11, 2017

(30) Foreign Application Priority Data

Jul. 7, 2014 (JP) .................................. 2014-139980

(51) Int. Cl.
| C08G 18/10 | (2006.01) |
| C08G 18/12 | (2006.01) |
| C08G 18/28 | (2006.01) |
| C08G 18/30 | (2006.01) |
| C08G 18/42 | (2006.01) |
| C08G 18/72 | (2006.01) |
| C08G 18/75 | (2006.01) |
| C08G 18/76 | (2006.01) |
| C09D 175/02 | (2006.01) |
| C09D 175/04 | (2006.01) |
| C08G 18/44 | (2006.01) |
| C08G 18/73 | (2006.01) |
| C09D 175/06 | (2006.01) |

(52) U.S. Cl.
CPC ........... C09D 175/04 (2013.01); C08G 18/10 (2013.01); C08G 18/12 (2013.01); C08G 18/2825 (2013.01); C08G 18/30 (2013.01); C08G 18/4202 (2013.01); C08G 18/4238 (2013.01); C08G 18/4277 (2013.01); C08G 18/44 (2013.01); C08G 18/722 (2013.01); C08G 18/73 (2013.01); C08G 18/755 (2013.01); C08G 18/758 (2013.01); C08G 18/7671 (2013.01); C09D 175/06 (2013.01)

(58) Field of Classification Search
CPC .. C09D 175/04; C09D 175/02; C09D 175/06; C08G 18/10; C08G 18/12; C08G 18/2825; C08G 18/30; C08G 18/4202; C08G 18/4238; C08G 18/4277; C08G 18/722; C08G 18/758; C08G 18/7671
See application file for complete search history.

(56) References Cited

U.S. PATENT DOCUMENTS

| 6,433,072 B1 * | 8/2002 | Gobel ................ | C08G 18/0823 524/591 |
| 2006/0292306 A1 * | 12/2006 | Goebel .............. | C08G 18/0823 427/402 |
| 2013/0102723 A1 * | 4/2013 | Wamprecht ........ | C08G 18/3203 524/537 |

FOREIGN PATENT DOCUMENTS

| CN | 102405243 A | 4/2012 |
| CN | 102656202 A | 9/2012 |
| CN | 103562255 A | 2/2014 |
| JP | 2005-206674 A | 8/2005 |
| JP | 2007-112986 A | 5/2007 |
| JP | 2008-37993 A | 2/2008 |
| JP | 2008-63395 A | 3/2008 |
| JP | 2008-75048 A | 4/2008 |
| JP | 2008-303284 A | 12/2008 |
| JP | 2011-140644 A | 7/2011 |
| JP | 2014-43554 A | 3/2014 |

(Continued)

OTHER PUBLICATIONS

International Search Report dated Jul. 28, 2015 in PCT/JP2015/069397.

(Continued)

*Primary Examiner* — Bijan Ahvazi
*Assistant Examiner* — Thuy-Ai N Nguyen
(74) *Attorney, Agent, or Firm* — Oblon, McClelland, Maier & Neustadt, L.L.P.

(57) ABSTRACT

Provided is a polyurethane urea resin composition exhibiting UV absorption-agent resistance that achieves both durability and liquid resistance against UV absorption agents included in cosmetic products or the like, and that is capable of being used for a molded body and a coating material which exhibit excellent properties such as abrasion resistance, mar resistance, oleic acid resistance, water resistance, stain resistance, and weather resistance. The polyurethane urea resin composition exhibiting UV-absorption-agent resistance is obtained by reacting a polyol (A), a polyisocyanate (B), a molecular weight modifier (C), and a diamine (D), and can be used as a molded body and a member-coating material to impart durability and liquid resistance against UV absorption agents.

20 Claims, No Drawings

(56) References Cited

FOREIGN PATENT DOCUMENTS

WO    WO 2012/165569 A1    12/2012

OTHER PUBLICATIONS

International Preliminary Report on Patentability and Written Opinion dated Jan. 10, 2017 in PCT/JP2015/069397 (with English translation).
Combined Office Action and search Report dated Sep. 5, 2018 in Chinese Patent Application No. 201580036854.8, 6 pages (with English translation of categories of cited documents).

* cited by examiner

POLYURETHANE UREA RESIN COMPOSITION EXHIBITING UV-ABSORPTION-AGENT RESISTANCE, MOULDED BODY USING SAID COMPOSITION, AND COATING MATERIAL

TECHNICAL FIELD

The present invention relates to a polyurethane urea resin composition exhibiting UV-absorption-agent resistance, a moulded body and a coating material in which the composition is used, useful for electronic apparatus members such as communication tablets, clothes, furniture/household electric appliance members, miscellaneous goods for daily use, and automobile members.

BACKGROUND ART

Polyurethane urea resins are excellent in various physical properties such as wear resistance, pliability, plasticity, flexibility, processability, adhesion, and chemical resistance, also highly suitable for various processing methods, and therefore widely used as resin components of coating materials, inks, adhesives, paints, and the like or as various moulded bodies such as films and sheets for electronic apparatus members, clothes, furniture/household electric appliances, miscellaneous goods for daily use, building/construction, and automobile members.

These polyurethane urea resins are generally obtained by reacting a polyol component, a polyisocyanate component, and further a chain extender component, and polyurethane urea resins having various properties according to the type reach component and combination are provided. In particular, moulded bodies and coating materials in which such resins are used can impart a tactile feature such as a moist texture, and are therefore commonly used in electronic apparatus member applications, cloth applications, furniture/household electric appliance applications, applications to miscellaneous goods for daily use, and automobile member applications. However, it is considered that, when in use in contact with a human body for a long period of time, phenomena of the deterioration of the moulded-body surface and the development of tackiness occur due to sebum components contained in sweat and oleic acid, UV absorption agent components, and the like contained in skin protection cream, and they may not withstand long-term use.

With such a background, polyurethane-based resins exhibiting oil resistance against oleic acid, which is a primary constituent of sebum components, are under development.

As a polyurethane-based resin excellent in oleic acid resistance, a curable composition is proposed that contains a polyisocyanate compound, a polycarbonate diol in which 1,5-pentanediol and 1,6-hexanediol are used in an appropriate range of a compositional ratio, and polysiloxane as essential components, that has a soft tactile feel, and that is excellent in oleic acid resistance (see, for example, Patent Literature 1 to Patent Literature 4).

Also, a coating agent composition has been proposed that is composed of a polycarbonate diol composed of 2-methyl-1,3-propanediol or 3-methyl-5-pentanediol and a diisocyanate compound, that has water resistance and oil resistance against oleic acid, beef tallow, and the like, and that is excellent in elastic strength and excellent in adhesion to members (see, for example, Patent Literature 5 and Patent Literature 6).

CITATION LIST

Patent Literature

Patent Literature 1: Japanese Unexamined Patent Publication No. 2007-112986
Patent Literature 2: Japanese Unexamined Patent Publication No. 2008-063395
Patent Literature 3: Japanese Unexamined Patent Publication No. 2008-075048
Patent Literature 4: Japanese Unexamined Patent Publication No. 2008-303284
Patent Literature 5: Japanese Unexamined Patent Publication No. 2008-037993
Patent Literature 6: Japanese Unexamined Patent Publication No. 2005-206674

SUMMARY OF INVENTION

Technical Problem

Moulded bodies and coating materials to date have improvements in oil resistance against oil components such as oleic acid and beef tallow; however, fluid resistance and durability against UV absorption agents contained in cosmetics and the like are often insufficient, and it is presumed that the attachment of a UV absorption agent results in phenomena such as the appearance deterioration of the moulded-body surface and the development of tackiness.

The present invention has been conceived in view of the above circumstances and provides a polyurethane urea resin composition exhibiting UV-absorption-agent resistance, and a moulded body and a coating material in which the composition is used, achieving both fluid resistance and durability against UV absorption agents contained in cosmetics and the like and being excellent in various physical properties such as wear resistance, abrasion resistance, oleic acid resistance, water resistance, stain resistance, and weather resistance, by using a polyurethane urea resin composition exhibiting. UV-absorption-agent resistance obtained by reacting at least a polyol (A), a polyisocyanate (B), a molecular weight modifier (C), and a diamine (D) as a moulded body and as a coating material of members.

Solution to Problem

That is to say, the present invention includes the following embodiment;
(1) A polyurethane urea resin composition exhibiting UV-absorption-agent resistance, the polyurethane urea resin composition comprising as monomer units:
polyol (A);
a polyisocyanate (B);
a molecular weight modifier (C); and
a diamine (D), wherein
in the polyurethane urea resin composition, a urea group concentration is 0.5 to 1 mmol/g, a urethane group concentration is 1 mmol/g or less, and a urethane group concentration ratio calculated from the following Mathematical Expression 1 is 40 to 70%, Urethane group concentration ratio=Urethane group concentration×100/(Urethane group concentration+Urea group concentration) (Mathematical Expression 1).

(2) The polyurethane urea resin composition exhibiting. UV-absorption-agent resistance according to (1), wherein the polyisocyanate (B) is an alicyclic diisocyanate, and the molecular weight modifier (C) is at least one selected from $C_{1-20}$ end-capping alcohols and/or end-capping amines.

(3) The polyurethane urea resin composition exhibiting UV-absorption-agent resistance according to (1) or (2), wherein the polyurethane urea resin composition exhibiting UV-absorption-agent resistance has a number average molecular weight of 60000 to 100000 based on gel permeation chromatography (GPC), and a molecular weight of 300000 or more in a molecular weight distribution is 20% or less in area ratio.

(4) A method for producing a polyurethane urea resin composition exhibiting UV-absorption-agent resistance, the method comprising: reacting a polyol (A), a polyisocyanate (B), a molecular weight modifier (C), and a diamine (D) in the presence or absence of an organic solvent, wherein the reaction is performed such that in the polyurethane urea resin composition, a urea group concentration is 0.5 to 1 mmol/g, a urethane group concentration is 1 mmol/g or less, and a urethane group concentration ratio calculated from the following Mathematical Expression 1 is 40 to 70%, Urethane group concentration ratio=Urethane group concentration×100/(Urethane group concentration+Urea group concentration)   (Mathematical Expression 1).

(5) The method for producing a polyurethane urea resin composition according to (4), wherein the polyol (A), the polyisocyanate (B), the molecular weight modifier (C), and the diamine (D) are reacted in steps comprising the following first step to third step:

First step: producing an isocyanate group-terminated prepolymer I by feeding the polyol (A) and the polyisocyanate (B) in amounts such that an isocyanate group is in an excessive amount, and performing a urethane forming reaction in the presence or absence of the organic solvent;

Second step: producing an isocyanate group-terminated prepolymer II by reacting the isocyanate group-terminated prepolymer I and the molecular weight modifier (C); and Third step: performing a urea forming reaction of the isocyanate group terminated prepolymer II, the diamine (D), and optionally the molecular weight modifier (C).

(6) A moulded body comprising the polyurethane urea resin composition exhibiting UV-absorption-agent resistance according to any one of (1) to (3).

(7) A coating material comprising the polyurethane urea resin composition exhibiting UV-absorption-agent resistance according to any one of (1) to (3).

Advantageous Effects of Invention

By using the polyurethane urea resin composition exhibiting UV-absorption-agent resistance of the present invention for a moulded body and for a coating material of members, both fluid resistance and durability against UV absorption agents contained in cosmetics and the like not achievable to date can be achieved and, also, various physical properties such as wear resistance, abrasion resistance, oleic acid resistance, water resistance, stain resistance, and weather resistance can be imparted.

DESCRIPTION OF EMBODIMENTS

The polyurethane urea resin composition exhibiting UV-absorption-agent resistance of the present invention is obtained by reacting at least a polyol (A), a polyisocyanate (B), a molecular weight modifier (C), and a diamine (D), and in this resin composition, the urea group concentration is 0.5 to 1 mmol/g, the urethane group concentration is 1 mmol/g or less, and the urethane group concentration ratio is 40 to 70%.

By adjustment to these ranges, fluid resistance and durability against a UV absorption agent (hereinafter sometimes referred to as UV-absorption-agent resistance) can be imparted.

Here, the UV absorption agent used for a measure of UV-absorption-agent resistance and referred to in the Advantageous Effects of Invention will now be described in detail. Examples of the UV absorption agent include para-aminobenzoic acid-based, cinnamic acid-based, benzophenone-based, salicylic acid-based, benzoyl triazole-based, other aromatic-based UV absorption agents, and mixtures of one or more of these mainly contained in cosmetics and the like. It is presumed that when moulded bodies and coating materials do not have UV-absorption-agent resistance, the UV absorption agent migrates to the moulded bodies and the coating materials, thus resulting in phenomena such as the deterioration of the appearance of the moulded-body surface and the development of tackiness.

<Para-Aminobenzoic Acid-Based>

Specific examples of para-aminobenzoic acid-based include para-aminobenzoic acid, ethyl para-aminobenzoate, glyceryl-p-aminobenzoate, isoamyl-p-dimethylaminobenzoate, and 2-ethylhexyl-4-dimethylaminobenzoate.

<Cinnamic Acid-Based>

Specific examples of cinnamic acid-based include 2-ethoxyethyl-p-methoxycinnamate, ethylhexyl-p-methoxycinnamate, diisopropyl methyl cinnamate, diisopropyl ethyl cinnamate, isopropyl methoxycinnamate, and 2-ethylhexyl-4-methoxycinnamate.

<Benzophenone-Based>

Specific examples of benzophenone-based include 2-hydroxy-4-methoxy benzophenone, 2-hydroxy-4-methoxybenzophenone-5-sulfonic acid, 2-hydroxy-4-methoxybenzophenone-5-sulfonic acid trihydrate, 2,4-dihydroxybenzophenone, 2,2'-hydroxy-4,4'-dimethoxybenzophenone, sodium 2,2'-hydroxy-4,4'-dimethoxy-5,5'-disulfobenzophenone, 2,2'-4,4'-tetrahydroxybenzophenone, and sodium hydroxymethoxysulfobenzophenone.

<Salicylic Acid-Based>

Specific examples of salicylic acid-based include dipropylene glycol salicylate, 2-ethylhexyl salicylate, 3,3,5-trimethylcyclohexyl salicylate, octyl salicylate, and homomenthyl salicylate.

<Benzoyl Triazole-Based>

Specific examples of benzoyl triazole-based include 2-(2-hydroxy-5-methoxypropyl)-benzotriazole, 2-(2-hydroxy-5-methylphenyl)-2H-benzotriazole, 2-(3-tert-butyl-2-hydroxy-5-methylphenyl)-5-chloro-2H-benzotriazole, 2-(2-hydroxy-4-octyloxyphenyl)-2H-benzotriazole, and 2-(2-hydroxy-5-tert-octylphenyl)-2H-benzotriazole.

<Other Aromatic-Based UV Absorption Agents>

Specific examples of other aromatic-based UV absorption agents include 4-tert-butyl-4'-methoxybenzoylmethane, 4-tert-butylbenzoyl(4-methoxybenzoyl)methane, and 2-ethylhexyl 3,3-diphenyl-2-cyanoacrylate.

Among these UV absorption agents, ethyl para-aminobenzoate, 2-ethylhexyl-4-methoxycinnamate, 2-hydroxy-4-methoxybenzophenone, 2-ethylhexyl salicylate, 3,3,5-trimethylcyclohexyl salicylate, 4-tert-butylbenzoyl(4-methoxybenzoyl)methane, and 2-ethylhexyl 3,3-diphenyl-2-cyanoacrylate in particular can be major inhibitory factors with respect to the UV-absorption-agent resistance of moulded bodies and coating materials.

Also, the polyol (A) used in the present invention is not particularly limited as long as it has the above properties, examples include polycarbonate polyols, polycaprolactone polyols, polyester polyols, polyether polyols, polyolefin polyols, acrylic polyols, silicone polyols, castor oil-based polyols, and fluorine-based polyols, and one of these or two or more in combination can be used.

As for the molecular weight of the polyol (A), it is preferable that the number average molecular weight be 500 to 50000, and more preferably 1000 to 4000. When the number average molecular weight is less than 500, UV-absorption-agent resistance may be impaired, and when the upper limit is exceeded, heat resistance may be impaired.

Also, as for the polyol (A), the number of active hydrogen groups in one molecule, or that is to say, the average number of functional groups, i.e., hydroxy groups that are active hydrogen groups contained in the polyol, is preferably 1.9 to 4.0. When the number of active hydrogen groups is less than the lower limit, wear resistance and mechanical properties may be impaired. Also, when the upper limit is exceeded, flexibility and UV-absorption-agent resistance may be impaired.

<Polycarbonate Polyols>

Specific examples of polycarbonate polyols include those obtained from a dealcoholization reaction or a dephenolization reaction of one or more of low-molecular polyols having general formula (I) wherein R is a $C_{2-20}$ divalent aliphatic or alicyclic hydrocarbon, such as ethylene glycol, 1,2-propanediol, 1,3-propanediol, 1,2-butanediol, 1,3-butanediol, 1,4-butanediol, 1,5-pentanediol, 1,6-hexanediol, 1,8-octanediol, 1,9-nonanediol, 3-methyl-1,5-pentanediol, 3,3-dimethylolheptane diethylene glycol, dipropylene glycol, neopentyl glycol, cyclohexane-1,4-diol, cyclohexane-1,4-dimethanol, dimer acid diol, ethylene oxide or propylene oxide adducts of bisphenol A, bis(β-hydroxyethyl)benzene, xylylene glycol, glycerin, trimethylolpropane, and pentaerythritol, with dialkyl carbonates such as dimethyl carbonate and diethyl carbonate, alkylene carbonates such as ethylene carbonate and propylene carbonate, and diaryl carbonates such as diphenyl carbonate, dinaphthyl carbonate, dianthryl carbonate, diphenanthryl carbonate, diindanyl carbonate, and tetrahydronaphthyl carbonate. Also, from the viewpoint of imparting wear resistance, abrasion resistance, and oleic acid resistance, a polycarbonate polyol composed of 1,6-hexanediol and diethyl carbonate can be suitably used.

general formula (1)

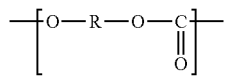

<Polycaprolactone Polyols>

Also, as specific examples of polycaprolactone polyols, usable are those obtained by subjecting one or both of ε-caprolactone and alkyl-substituted ε-caprolactone to ring opening addition using one or more low-molecular polyols such as ethylene glycol. 1,2-propanediol, 1,3-propanediol, 1,2-butanediol, 1,3-butanediol, 1,4-butanediol, 1,5-pentanediol, 1,6-hexanediol, 1,8-octanediol, 1,9-nonanediol, 3-methyl-1,5-pentanediol, 3,3-dimethylolheptane, diethylene glycol, dipropylene glycol, neopentyl cyclohexane-1,4-diol, cyclohexane-1,4-dimethanol, dimer acid diol, ethylene oxide or propylene oxide adducts of bisphenol A, bis(β-hydroxyethyl)benzene, xylylene glycol, glycerin, trimethylolpropane, and pentaerythritol as <Polyester Polyols>

Specific examples of polyester polyols include those obtained from a condensation polymerization reaction of one or more dicarboxylic acids such as phthalic acid, isophthalic acid, terephthalic acid, naphthalenedicarboxylic acid, succinic acid, tartaric acid, oxalic acid, malonic acid, glutaric acid, adipic acid, pimelic acid, suberic acid, glutaconic acid, azelaic acid, sebacic acid, 1,4-cyclohexyldicarboxylic acid, α-hydromuconic acid, β-hydromuconic acid, α-butyl-α-ethylglutaric acid, α,β-diethylsuccinic acid, maleic acid, fumaric acid, anhydrides thereof or the like, with one or more low-molecular polyols having a molecular weight of 500 or less, such as ethylene glycol, 1,2-propanediol, 1,3-propanediol, 1,2-butanediol, 1,3-butanediol, 1,4-butanediol, 1,5-pentanediol, 1,6-hexanediol, 1,8-octanediol, 1,9-nonanediol, 3-methyl-1,5-pentanediol, 3,3-dimethylolheptane, diethylene glycol, dipropylene glycol, neopentyl glycol, cyclohexane-1,4-diol, cyclohexane-1,4-dimethanol, dimer acid diol, ethylene oxide or propylene oxide adducts of bisphenol A, bis(β-hydroxyethyl)benzene, xylylene glycol, glycerin, trimethylolpropane, and pentaerythritol. Also, polyester-amide polyols obtained by partially replacing low-molecular polyols with low-molecular polyamines or low-molecular amino alcohols such as hexamethylenediamine, isophoronediamine, and monoethanolamine can be used as well.

<Polyether Polyols>

Also, specific examples of polyether polyols include polyether polyols obtained by subjecting alkylene oxides such as ethylene oxide, propylene oxide, and butylene oxide to addition polymerization, or polyether polyols obtained by subjecting alkyl glycidyl ethers such as methyl glycidyl ether, aryl glycidyl ethers such as phenyl glycidyl ether, or cyclic ether monomers such as tetrahydrofuran to ring opening polymerization, using a compound having two or more, preferably two to three, active hydrogen groups as an initiator, such as low-molecular polyols such as ethylene glycol, 1,2-propanediol, 1,3-propanediol, 1,2-butanediol, 1,3-butanediol, 1,4-butanediol, 1,5-pentanediol, 1,6-hexanediol, 1,8-octanediol. 1,9-nonanediol, 3-methyl-1,5-pentanediol, 3,3-dimethylolheptane, diethylene glycol, dipropylene glycol, neopentyl glycol, cyclohexane-1,4-diol, cyclohexane-1,4-dimethanol, dimer acid diol, bisphenol A, bis(β-hydroxyethyl)benzene, xylylene glycol, glycerin, trimethylolpropane, and pentaerythritol, or low-molecular polyamines such as ethylenediamine, propylenediamine, toluenediamine, meta-phenylenediamine, diphenylmethanediamine, and xylylenediamine.

<Polyolefin Polyols>

Also, specific examples of polyolefin polyols include polybutadiene, hydrogenated polybutadiene, polyisoprene, and hydrogenated polyisoprene having two or more hydroxy groups.

<Acrylic Polyols>

Examples of acrylic polyols include those obtained from acrylic acid esters and/or methacrylic acid esters [hereinafter referred to as (meth)acrylic acid esters], acrylic acid hydroxy compounds and/or methacrylic acid hydroxy compounds [hereinafter referred to as (meth)acrylic acid hydroxy compounds] having within the molecule at least one hydroxy group that can be a point of reaction, and polymerization initiators by using thermal energy or light energy such as ultraviolet rays or electron rays to copolymerize the acrylic monomers.

<(Meth)Acrylic Acid Esters>

Specific examples of (meth)acrylic acid esters include $C_{1-20}$ alkyl esters. Specific examples of such (meth)acrylic acid esters include (meth)acrylic acid alkyl esters such as methyl (meth)acrylate, ethyl (meth)acrylate, propyl (meth) acrylate, butyl (meth)acrylate, pentyl, (meth)acrylate, hexyl (meth)acrylate, 2-ethylhexyl (meth)acrylate, octyl (meth) acrylate, nonyl (meth)acrylate, decyl (meth)acrylate, and dodecyl (meth)acrylate; esters of (meth)acrylic acids with acyclic alcohols, such as cyclohexyl (meth)acrylate; and (meth)acrylic acid aryl esters such as phenyl (meth)acrylate and benzyl (meth)acrylate. Such (meth)acrylic acid esters can be used singly or in combinations or two or more.

<(Meth)Acrylic Acid Hydroxy Compounds>

Specific examples of (meth)acrylic acid hydroxy compounds have at least one hydroxy group that can become a point of reaction with the polyisocyanate (B) within the molecule and, specifically, include acrylic acid hydroxy compounds such as 2-hydroxyethyl acrylate, 2-hydroxypropyl acrylate 4-hydroxybutyl acrylate, 3-hydroxy-2,2-dimethylpropyl acrylate, and pentaerythritol triacrylate. Also, examples include methacrylic acid hydroxy compounds such as 2-hydroxyethyl methacrylate, 2-hydroxyproyl methacrylate, 4-hydroxybutyl methacrylate, 3-hydroxy-2,2-dimethylpropyl methacrylate, and pentaerythritol trimethacrylate. These acrylic acid hydroxy compounds and methacrylic acid hydroxy compounds can be used singly or in combinations of two or more.

<Silicone Polyols>

Specific examples of silicone polyols include vinyl group-containing silicone compounds obtained b) polymerizing γ-methacryloxypropyltrimethoxy silane or the like, and polysiloxanes having at least one terminal hydroxyl group within the molecule, such as α,ω-dihydroxy polydimethylsiloxane and α,ω-dihydroxy polydiphenylsiloxane.

<Castor Oil-Based Polyols>

Specific examples of castor oil-based polyols include linear or branched polyester polyols obtained by a reaction of castor oil fatty acid and polyols. Also, dehydrated castor oil, partially dehydrated castor oil that is partially dehydrated, and hydrogenated castor oil to which hydrogen is added can be used as well.

<Fluorine-Based Polyols>

Specific examples of fluorine-based polyols are linear or branched polyols obtained by a copolymerization reaction to which a fluorine-containing monomer and a monomer having a hydroxy group are essential components. Here, it is preferable that the fluorine-containing monomer be a fluoroolefin, and examples include tetrafluoroethylene, chlorotrifluoroethylene, trichlorofluoroethylene, hexafluoropropylene, vinylidene fluoride, vinyl fluoride, trifluoromethyl trifluoroethylene. Also, examples of the monomer having a hydroxyl group include hydroxyalkyl vinyl ethers such as hydroxyethyl vinyl ether, 4-hydroxybutyl vinyl ether, and cyclohexanediol monovinyl ether, hydroxyalkyl allyl ethers such as 2-hydroxyethyl allyl ether, hydroxyl group-containing vinyl carboxylates such as vinyl hydroxyalkylcrotonate, or monomers having a hydroxyl group such as allyl esters.

Also, from the viewpoint of durability, weather resistance, flexibility, and the like, a copolymer polyol obtained by subjecting the above polycarbonate polyol, the above polycaprolactone polyol and an aliphatic glycol to an ester exchange reaction can be suitably used for the polyol (A). It is preferable that the optimal ratio of the polycarbonate polyol and the aliphatic glycol to the polycaprolactone polyol [(Polycarbonate polyol+Aliphatic glycol)/Polycaprolactone polyol] be 99/1 to 60/40 in mass ratio. Properties such as durability, weather resistance, and flexibility of the copolymer polyol thus obtained can be more increased than when respective components are used singly or as a mixture.

<Aliphatic Glycols>

Examples of aliphatic glycols include ethylene glycol, 1,2-propanediol, 1,3-propanediol, 1,2-butanediol, 1,3-butanediol, 1,4-butanediol, 1,5-pentanediol, 3-methyl-1,5-pentanediol, 1,6-hexanediol, 1,8-octanediol, 1,9-nonanediol, dimethylolheptane, diethylene glycol, dipropylene glycol, and neopentyl glycol.

<Method for Producing Copolymer Polyol>

As a method for producing the copolymer polyol, a known technique can b e used. Generally, the polycarbonate polyol, the polycaprolactone polyol, and the aliphatic glycol are blended, dissolved at 60° C. until becoming uniform while bubbling nitrogen gas. Then, an ester exchange reaction is performed at 190° C. until the target molecular weight is attained.

Next, the polyisocyanate (B) used for the polyurethane urea resin composition exhibiting UV-absorption-agent resistance of the present invention will now be described in detail.

It is preferable that the polyisocyanate (B) of the present invention be an alicyclic diisocyanate from the viewpoint of UV-absorption-agent resistance.

<Alicyclic Diisocyanates>

Specific examples of such alicyclic diisocyanates include isophorone diisocyanate, cyclohexane diisocyanate hydrogenated diphenylmethane diisocyanate, norbornane diisocyanate, hydrogenated tolylene diisocyanate, hydrogenated xylene diisocyanate, and hydrogenated tetramethyl xylene diisocyanate. Among these alicyclic diisocyanates, isophorone diisocyanate is particularly preferable from the viewpoint of UV-absorption-agent resistance and productivity.

Also, as long as properties are not impaired, aromatic diisocyanates, aliphatic diisocyanates, alicyclic diisocyanates, araliphatic diisocyanates, and those obtained from these polyisocyanates as raw materials, such as isocyanurate group-containing polyisocyanates, urethdione group-containing polyisocyanates, urethdione group and isocyanurate group-containing polyisocyanates, urethane group-containing polyisocyanates, allophanate group-containing polyisocyanates, biuret group-containing polyisocyanates, and urethimine group-containing polyisocyanates can be used in combination as well.

<Aromatic Diisocyanates>

Specific examples of aromatic diisocyanates include 2,4-tolylene diisocyanate, 2,6-tolylene diisocyanate, 2,4-tolylene diisocyanate/2,6-tolylene diisocyanate mixture, 4,4'-diphenylmethane diisocyanate, 2,4'-diphenylmethane diisocyanate, a 2,4'-diphenylmethane diisocyanate/4,4'-diphenylmethane diisocyanate mixture, 4,4'-diphenylether diisocyanate, 2-nitrodiphenyl-4,4'-diisocyanate, 2,2'-diphenylpropane-4,4'-diisocyanate, 3,3-dimethyldiphenylmethane-4,4'-diisocyanate, 4,4'-diphenylpropane diisocyanate, m-phenylene diisocyanate, p-phenylene diisocyanate, naphthylene-1,4-diisocyanate, naphthylene-1,5-diisocyanate, and 3,3'-dimethoxydiphenyl-4,4'-diisocyanate.

<Aliphatic Diisocyanates>

Specific examples of aliphatic diisocyanates include hexamethylene diisocyanate, tetramethylene diisocyanate, 2-methyl-pentane-1,5-diisocyanate, 3-methyl-pentane-1,5-diisocyanate, lysine diisocyanate, and trioxyethylene diisocyanate.

<Araliphatic Diisocyanates>

Specific examples of araliphatic diisocyanates include 1,3- or 1,4-xylylene diisocyanate or a mixture thereof, 1,3- or 1,4-bis(1-isocyanato-1-methylethyl)benzene or a mixture thereof, and ω,ω'-diisocyanato-1,4-diethylbenzene.

Next, the molecular weight modifier (C) used for the polyurethane urea resin composition exhibiting UV-absorption-agent resistance of the present invention will be described in detail.

It is preferable that the molecular weight modifier (C) of the present invention be at least one selected from $C_{1-20}$ end-capping alcohols and/or end-capping amines, and UV-absorption-agent resistance can be increased by adjusting the molecular weight of the resin composition with the molecular weight modifier.

<End-Capping Alcohols>

Specific examples of end-capping alcohols are $C_{1-20}$ monoalcohols, including methanol, ethanol, 1-propanol, 2-propanol, 1-butanol, 2-butanol, isobutanol, 1-pentanol, 2-pentanol, isoamyl alcohol, 1-hexanol, 2-hexanol, 1-heptanol, 1-octanol, 2-ethyl-1-hexanol, 3,3,5-trimethyl-1-hexanol, 1-tridecanol, 2-tridecanol, 2-octyldodecanol, 1-pentadecanol, 2-pentadecanol, cyclopentadecanol, palmityl alcohol, stearyl alcohol, cyclopentanol, cyclohexanol, methylcyclohexanol, and trimethylcyclohexanol, and can be used singly or in combinations of two or more. Among these, from the viewpoint of compatibility monoalcohols having a side chain, such as 2-propanol, 2-butanol, isobutanol, 2-pentanol, isoamyl alcohol, 2-hexanol, 2-ethyl-1-hexanol, 3,3,5-trimethyl-1-hexanol, 2-tridecanol, 2-octyldodecanol, and 2-pentadecanol, are excellent in UV-absorption-agent resistance and are preferable, and 2-ethyl-1-hexanol is most preferable.

<End-Capping Amines>

Specific examples of end-capping amines include primary amine and secondary amine compounds having one functional group, such as ethylamine, morpholine, propylamine, butylamine, isobutylamine, tert-butylamine, pentylamine, cyclopentylamine, hexylamine, cyclohexylamine, heptylamine, octylamine, decylamine, dodecylamine, tetradecylamine, hexadecylamine octadecylamine, aniline, o-fluoroaniline, m-fluoroaniline, p-fluoroaniline, o-anisidine, m-anisidine, p-anisidine, o-toluidine, m-toluidine, p-toluidine, 2-naphthylamine, 2-aminobiphenyl, 4-aminobiphenyl, 4-aminobiphenyl, dimethylamine, dibutylamine, diethylamine, monoethanolamine, diethanolamine, N-methylethanolamine, N-ethylethanolamine, N-n-butylethanolamine, N-t-butylethanolamine, hydroxyethylpiperazine, piperazine, 2-methylpiperazine, homopiperazine, N-methylhomopiperazine, 2,6-dimethylpiperazine, N-methylpiperazine, N-ethylpiperazine, N-ethoxycarbonylpiperazine, N-benzylpiperazine, 2,6-dimethylmorpholine, piperidine, 2,6-dimethylpiperidine, 3,3-dimethylpiperidine, 3,5-dimethylpiperidine, 2-ethylpiperidine, 4-piperidone ethyleneketal pyrrolidine, 2,5-dimethylpyrrolidine N-(3-aminopropyl)diethanolamine, N-cyclohexylethanolamine, 2-pipecoline, 3-pipecoline, 4-pipecoline, 3-pyrrolidinol, indoline, iminobenzyl, thiazoline, N-methylcyclohexylamine, pyrrole, 2-methylpyrrole, 2,4-dimethylpyrrole, 2,5-dimethylpyrrole, nitropyrrole, 2-acetylpyrrol, chlorinated pyrrole, brominated pyrrole, iodinated pyrrole, 3-pyrroline, pyrazole, imidazole, 2-pyrazoline, purine, indole, carbazole, N-methylaniline, N-ethylaniline, N-methylbenzylamine, N-methylphenethylamine, and diphenylamine, and can be used singly or in combinations of two or more. Among these, ethylamine, morpholine, monoethanolamine, propylamine, dibutylamine, diethylamine, diethanolamine, N-methylethanolamine, and N-ethylethanolamine are excellent in UV-absorption-agent resistance and are preferable.

Next, the diamine (D) used for the formation of the urea group of the polyurethane urea resin composition exhibiting UV-absorption-agent resistance of the present invention will now be described in detail.

As the diamine (D) of the present invention, it is preferable to use an alicyclic diamine from the viewpoint of UV-absorption-agent resistance.

<Alicyclic Diamines>

Examples of such alicyclic diamines include isophoronediamine, cyclohexanediamine, norbornanediamine, hydrogenated tolylenediamine, hydrogenated xylenediamine, and hydrogenated tetramethyl xylenediamine. Among these diamines, isophoronediamine is particularly preferable from the viewpoint of imparting excellent UV-absorption-agent resistance.

Also, as long as properties are not impaired, ethylenediamine, butylenediamine, hexamethylenediamine, diphenylmethanediamine, tolylenediamine, xylylenediamine, 2-hydroxyethylethylenediamine, 2-hydroxyethylpropylenediamine, di-2-hydroxyethylethylenediamine, di-2-hydroxyethylpropylenediamine, 2-hydroxypropylethylenediamine, di-2-hydroxypropylethylenediamine, and 2-hydroxy-1,3-propanediamine can be used in combination as well.

Next, a general method for producing the polyurethane urea resin composition exhibiting UV-absorption-agent resistance of the present invention will now be described. Also, the method for producing the polyurethane urea resin composition exhibiting UV-absorption-agent resistance is not limited thereto.

<Method for Producing Polyurethane Urea Resin Composition Exhibiting UV-Absorption-Agent Resistance>

First step: An isocyanate group-terminated prepolymer I is produced by feeding the polyol (A) and the polyisocyanate (B) in amounts such that an isocyanate group is in an excessive amount, and performing a urethane forming reaction in the presence or absence of an organic solvent preferably at 20 to 100° C.

Second step: An isocyanate group-terminated prepolymer II is produced by reacting the isocyanate group-terminated prepolymer I and the molecular weight modifier (C) preferably at 20 to 100° C.

Third step: A urea forming reaction of the isocyanate-group-terminated prepolymer II, the diamine (D), and optionally the molecular weight modifier (C) is performed preferably at 20 to 60° C.

Also, in the sequence of production steps, it is preferable to allow the reactions to proceed in nitrogen gas or a dry air stream to suppress the reaction between the isocyanate group and water.

<First Step: Step of Producing Isocyanate Group-Terminated Prepolymer I>

As for the "amounts such that an isocyanate group is in an excessive amount" in the first step, for example, when raw materials are fed, it is preferable to feed them such that the molar ratio of the isocyanate group of the organic diisocyanate (B) and the hydroxy group of the polyol (A) is $R=1.5$ to $3.0$ in terms of the isocyanate group/the hydroxy group, and more preferably $R=1.8$ to $2.7$. When the isocyanate group is less than the lower limit, a number of urethane groups are introduced into the resin skeleton, and thus UV-absorption-agent resistance may be impaired. It is not preferable that the isocyanate group exceed the upper limit because a urea product is generated, and thus turbidity and aggregate generation may occur.

Also, the reaction temperature of the urethane forming reaction is 20 to 120° C., and is preferably 50 to 100° C. Although this urethane forming reaction proceeds without a catalyst, a known urethane forming reaction catalyst can also be used to promote the reaction.

<Urethane Forming Reaction Catalysts>

As specific examples of catalysts usable in the urethane forming reaction, organometallic compounds such as dibutyltin diacetate, dibutyltin dilaurate, and dioctyltin dilaurate, organic amines such as triethylenediamine and triethylamine, and salts thereof can be selected and used.

Although the reaction time of the urethane forming reaction varies according to the presence/absence and kind of a catalyst and temperature, generally 10 hours or less and preferably 1 to 5 hours are sufficient. As the reaction time increases, defects such as coloring may occur.

Also, as the organic solvent used for producing the polyurethane urea resin composition exhibiting UV absorption-agent resistance, a solvent that the reaction is not affected in the presence of the organic solvent is suitably selected.

<Organic Solvents Used for Production>

Specific examples of organic solvents include aliphatic hydrocarbons such as octane, alicyclic hydrocarbons such as cyclohexane and methylcyclohexane ketones such as methyl ethyl ketone, methyl isobutyl ketone, and cyclohexanone esters such as ethyl acetate, propyl acetate, butyl acetate, and isobutyl acetate, glycol ether esters such as ethylene glycol ethyl ether acetate, propylene glycol monomethyl ether acetate, 3-methyl-3-methoxy butyl acetate, ethyl-3-ethoxypropionate, ethers such as dioxane, halogenated hydrocarbons such as methylene iodide and monochlorobenzene, polar aprotic solvents such as N-methylpyrrolidone, dimethylformamide, dimethylacetamide, dimethylsulfoxide, and hexamethylphosphonylamide. These solvents can be used singly or in combinations of two or more.

<Second Step: Step of Producing Isocyanate Group-Terminated Prepolymer II>

In the second step, it is preferable to produce an isocyanate group-terminated prepolymer II by reacting the isocyanate group-terminated prepolymer I obtained in the first step with the molecular weight modifier (C).

Also, as long as the above properties are not impaired, the molecular weight modifier (C) can be used in the third step as well. Here, as for the amount of modification by the molecular weight modifier (C), it is preferable that 1 to 3 mol % relative to the isocyanate group of the polyisocyanate (B) be modified. When the amount of modification is less than the lower limit, UV-absorption-agent resistance may be impaired. Also, when the upper limit is exceeded, heat resistance may be impaired.

<Third Step: Step of Subjecting Isocyanate Group-Terminated Prepolymer II to Urethane Forming Reaction>

In the third step, the isocyanate-group terminal prepolymer II produced in the second step and the diamine (D) or a mixture of the diamine (D) and the molecular weight modifier (C) are subjected to a urethane forming reaction, and thus the polyurethane urea resin composition exhibiting UV-absorption-agent resistance of the present invention having a number average molecular weight of 60000 to 100000 can be obtained. Also, as for the molar ratio of the diamine (D) and the molecular weight modifier (C) used in the second step or the third step, it is preferable to feed them such that the diamine (D)/the molecular weight modifier (C)=10 to 20. When this molar ratio is less than 10, mechanical properties may be impaired. Also, when it exceeds 20, UV-absorption-agent resistance may be impaired.

It is preferable that the number average molecular weight of the polyurethane urea resin composition exhibiting UV-absorption-agent resistance thus obtained be in the range of 60000 to 100000, and more preferably in the range of 70000 to 90000. It is not preferable that the number average molecular weight be less than 60000 because heat resistance may be impaired, and the number average molecular weight exceed 100000 because UV-absorption-agent resistance may be impaired. Also, as for the molecular weight distribution based on GPC, it is preferable that the molecular weight of 300000 or more be 20% or less in area ratio, and when the upper limit is exceeded, UV-absorption-agent resistance may be impaired.

Although the viscosity of the polyurethane urea resin composition exhibiting UV-absorption-agent resistance is not particularly limited, it is preferable that the viscosity be 5000 to 25000 mPa·s, more preferably 8000 to 20000 mP·s, at 25° C. A viscosity exceeding the upper limit may result in impaired processability or the like. Also, when adjusting viscosity, the dilution of an organic solvent and a two-component system that uses a crosslinking agent or the like can be suitably selected as well.

<Crosslinking Agents>

As specific examples of crosslinking agents, as long as properties are not impaired, the above aromatic diisocyanates, aliphatic diisocyanates, alicyclic diisocyanates, araliphatic diisocyanates, and those obtained from these polyisocyanates as raw materials, such as isocyanurate group-containing polyisocyanates, urethdione group-containing polyisocyanates, urethdione group and isocyanurate group-containing polyisocyanates, urethane group-containing polyisocyanates, allophanate group-containing polyisocyanates, biuret group-containing polyisocyanates, and urethimine group-containing polyisocyanates can be used in combination as well.

The polyurethane urea resin composition exhibiting UV-absorption-agent resistance obtained according to the present invention can be suitably blended with additives as necessary, such as an antioxidant, a UV absorption agent, a pigment, a dye, a solvent, a flame retardant, a hydrolysis inhibitor, a lubricant, a plasticizer, a filler, an antistatic agent, a dispersant, a catalyst, a storage stabilizer, a surfactant, and a leveling agent.

Next, processing methods for a moulded body and a coating material using the polyurethane urea resin composition exhibiting UV-absorption-agent resistance of the present invention will now be described.

The polyurethane urea resin composition exhibiting UV-absorption-agent resistance of the present invention is used as a moulded body and a coating material of electronic apparatus members such as communication tablets, clothes, furniture/household electric appliance members, miscellaneous goods for daily use, and automobile members.

The moulded body encompasses a member, a structure, a film, and a sheet, and is a member formed by a known technique such as casting or coating.

Also, the coating material is a coating film formed on a substrate by a known technique such as spray coating, knife coating, wire bar coating, doctor blade coating, reverse roll coating, or calendar coating after the polyurethane urea resin composition exhibiting UV-absorption-agent resistance of the present invention is mixed with the above crosslinking agent, additive, and the like as necessary and uniformly stirred.

<Substrates>

Examples of the above substrate include substrates formed of materials such as stainless steel, phosphate-treated steel, zinc steel, iron, copper, aluminum, brass, glass, acrylic resin, polycarbonate resin, polyethylene terephthalate resin, polyethylene naphthalate resin, polybutylene phthalate resin, polystyrene resin, AS resin, ABS resin, polycarbonate-ABS resin, 6-nylon resin, 6,6-nylon resin, MXD6 nylon resin, polyvinyl chloride resin, polyvinyl alcohol resin, polyurethane resin, phenol resin, melamine resin, polyacetal resin, chlorinated polyolefin resin, polyolefin resin, polyamide resin, polyether ether ketone resin, polyphenylene sulfide resin, NBR resin, chloroprene resin, SBR resin, SEBS resin, and olefin resins such as polyethylene and polypropylene; organic fiber containing as a primary constituent at least one selected from polyethylene terephthalate resin, polytrimethylene terephthalate resin, polybutylene terephthalate resin, polyethylene resin, polypropylene resin, polystyrene resin, 6-nylon resin, 6,6-nylon resin, acrylic resin, polyvinyl alcohol resin, cellulose, polylactic acid, cotton, and wool; inorganic fiber such as glass wool; and carbon fiber.

As for these substrates, corona discharge treatment, flame treatment, UV irradiation treatment, ozone treatment, or the like can be performed on the substrate surface in advance to increase adhesion, Also, it is preferable that the amount of the coating material applied be at least 40 g/m$^2$ or more in terms of resin solid content. When the amount is less than the lower limit, UV-absorption-agent resistance, wear resistance, and abrasion resistance may be impaired.

EXAMPLES

Below Examples of the present invention will now be described, but the present invention is not limited to these Examples.

<Synthesis of Polyurethane Urea Resin Composition Exhibiting UV-Absorption-Agent Resistance>

Example 1

To a 4-neck flask having a volume of 2 liters and equipped with a stirrer, a thermometer, a heater, and a distillation column were fed 252 g polyol 1, 350 g of N,N-dimethylformamide (hereinafter referred to as DMF), and 350 g of methyl ethyl ketone (hereinafter referred to as MEK), nitrogen gas bubbling was performed while uniformly stirring these at 45° C., and a solution of a polymeric polyol was thus prepared. To this polymeric polyol solution were fed 13.5 g of hexamethylene diisocyanate (manufactured by Nippon Polyurethane Industry Co., Ltd., NCO content: 49.9 mass %, hereinafter referred to as HDI) and 17.5 g of isophorone diisocyanate (manufactured by Evonik Japan Co., Ltd., NCO content: 37.8 mass %, hereinafter referred to as IPDI), a urethane forming reaction was performed at 75° C. for 3 hours in a nitrogen stream, and thereby an isocyanate group-terminated urethane prepolymer I solution was obtained. The NCO content of this prepolymer was 0.8 mass %.

To this isocyanate group-terminated urethane prepolymer I solution was fed 1.6 g of 2-tridecanol, a urethane forming reaction was performed at 75° C. for 3 hours in a nitrogen stream, and thereby an isocyanate group-terminated urethane prepolymer II solution was obtained. The NCO content of this prepolymer was 0.8 mass %. An amine solution obtained by mixing 15.0 g of isophoronediamine (hereinafter referred to as IPDA) and 0.4 g of monoethanolamine (hereinafter referred to as MEA) in advance was added to the resulting isocyanate group-terminated urethane prepolymer II solution, a chain extending reaction was performed at 40° C. for 4 hours, and thereby a polyurethane urea resin composition exhibiting UV-absorption-agent resistance PU-1 was obtained. The number average molecular weight of the polyurethane urea resin composition exhibiting UV-absorption-agent resistance PU-1 was 85000, the molecular weight of 300000 or more in the molecular weight distribution was 10% in area ratio, and the viscosity at 25° C. was 13000 mPa·s.

<GPC: Measurement of Molecular Weight>
(1) Measurement apparatus: HLC-8220 (manufactured by Tosoh Corporation)
(2) Columns: TSKgel (manufactured by Tosoh Corporation)
3000H-XL
G2500H-XL
G2000H-XL, G1000H-XL
(3) Carrier: DMF (N,N-dimethylformamide) containing 0.1% LiBr
(4) Detector: RI (refractive index) detector
(5) Temperature: 40° C.
(6) Flow rate: 1.000 ml/min
(7) Calibration curve: Standard polystyrene (manufactured by Tosoh Corporation)
F-80 (molecular weight: $7.06 \times 10^5$, molecular weight distribution: 1.05)
F-20 (molecular weight: $1.90 \times 10^5$, molecular weight distribution: 1.05)
F-10 (molecular weight: $9.64 \times 10^4$, molecular weight distribution: 1.01)
F-2 (molecular weight: $1.81 \times 10^4$, molecular weight distribution: 1.01)
F-1 (molecular weight: $1.02 \times 10^4$, molecular weight distribution: 1.02)
A-5000 (molecular weight: $5.97 \times 10^3$, molecular weight distribution: 1.02)
A-2500 (molecular weight: $2.63 \times 10^3$, molecular weight distribution: 1.05)
A-500 (molecular weight: $5.0 \times 10^2$, molecular weight distribution: 1.14)
(8) Sample solution concentration: 0.5% LiBr/DMF solution Example 2

To a 4-neck flask having a volume of 2 liters and equipped with a stirrer, a thermometer, a heater, and a distillation column were fed 250 g of polyol 2, 350 g of DMF, and 350 g of MEK, nitrogen gas bubbling was performed while uniformly stirring these at 45° C., and a solution of a polymeric polyol was thus prepared. To this polymeric polyol solution were fed 5 g of HDI and 30 g of IPDI, a urethane forming reaction was performed at 75° C. for 3 hours in a nitrogen stream, and thereby an isocyanate group-terminated urethane prepolymer I solution was obtained. The NCO content of this prepolymer was 0.7 mass %.

To this isocyanate group-terminated urethane prepolymer I solution was fed 0.5 g of n-butanol, a urethane forming reaction was performed at 75° C. for 3 hours in a nitrogen stream, and thereby an isocyanate group-terminated urethane prepolymer II solution was obtained. The NCO content of this prepolymer was 0.7 mass %. An amine solution obtained by mixing 14 g of IPDA and 0.5 g of MEA in advance was added to the resulting isocyanate group-terminated urethane prepolymer II solution, a chain extending reaction was performed at 40° C. for 4 hours, and thereby a polyurethane urea resin composition exhibiting UV-absorption-agent resistance PU-2 was obtained. The number average molecular weight of the polyurethane urea resin composition exhibiting UV-absorption-agent resistance PU-2 was 90000, the molecular weight of 300000 or more in the molecular weight distribution was 13% in area ratio, and the viscosity at 25° C. was 14000 mPa·s.

Example 3

To a 4-neck flask having a volume of 2 liters and equipped with a stirrer, a thermometer, a heater, and a distillation column were fed 250 g of polyol 3, 350 g of DMF, and 350 g of MEK, nitrogen gas bubbling was performed while uniformly stirring these at 45° C., and a solution of a polymeric polyol was thus prepared. To this polymeric polyol solution were fed 5 g of HDI and 30 g of IPDI, a urethane forming reaction was performed at 75° C. for 3 hours in a nitrogen stream, and thereby an isocyanate group-terminated urethane prepolymer I solution was obtained. The NCO content of this prepolymer was 7 mass %.

To this isocyanate group-terminated urethane prepolymer I solution was fed 0.5 g of n-butanol, a urethane forming reaction was performed at 75° C. for 3 hours in a nitrogen stream, and thereby an isocyanate group-terminated urethane prepolymer II solution was obtained. The NCO content of this prepolymer was 0.7 mass %. An amine solution obtained by mixing 14 g of IPDA and 0.5 g of MEA in advance was added to the resulting isocyanate group-terminated urethane prepolymer II solution, a chain extending reaction was performed at 40° C. for 4 hours, and thereby a polyurethane urea resin composition exhibiting UV-absorption-agent resistance PU-3 was obtained. The number average molecular weight of the polyurethane urea resin composition exhibiting UV-absorption-agent resistance PU-3 was 95000, the molecular weight of 300000 or more in the molecular weight distribution was 15% in area ratio, and the viscosity at 25° C. was 18000 mPa·s.

Example 4

To a 4-neck flask having a volume of 2 liters and equipped with a stirrer, a thermometer, a heater, and a distillation column were fed 236 g of polyol 4, 350 g of DMF, and 350 g of MEK, nitrogen gas bubbling was performed while uniformly stirring these at 45° C., and a solution of a polymeric polyol was thus prepared. To this polymeric polyol solution was fed 47 g of IPDI, a urethane forming reaction was performed at 75° C. for 3 hours in a nitrogen stream, and thereby an isocyanate group-terminated urethane prepolymer I solution was obtained. The NCO content of this prepolymer was 0.8 mass %.

To this isocyanate group-terminated urethane prepolymer I solution was fed 1 g of 2-ethyl-1-hexanol, a urethane forming reaction was performed at 75° C. for 3 hours in a nitrogen stream, and thereby an isocyanate group-terminated urethane prepolymer II solution was obtained. The NCO content of this prepolymer was 0.8 mass %. An amine solution obtained by mixing 15.5 g of IPDA and 0.5 g of morpholine in advance was added to the resulting isocyanate group-terminated urethane prepolymer II solution, a chain extending reaction was performed at 40° C. for 4 hours, and thereby a polyurethane urea resin composition exhibiting UV-absorption-agent resistance PU-4 was obtained. The number average molecular weight of the polyurethane urea resin composition exhibiting UV-absorption-agent resistance PU-4 was 85000, the molecular weight of 300000 or more in the molecular weight distribution was 10% in area ratio, and the viscosity at 25° C. was 13000 mPa·s.

Example 5

To a 4-neck flask having a volume of 2 liters and equipped with a stirrer, a thermometer, a heater, and a distillation column were fed 233 g of polyol 5, 350 g of DMF, and 350 g of MEK, nitrogen gas bubbling was performed while uniformly stirring these at 45° C., and a solution of a polymeric polyol was thus prepared. To this polymeric polyol solution was fed 50 g of IPDI, a urethane forming reaction was performed at 75° C. for 3 hours in a nitrogen stream, and thereby an isocyanate group-terminated urethane prepolymer I solution was obtained. The NCO content of this prepolymer was 0.9 mass %.

To this isocyanate group-terminated urethane prepolymer I solution was fed 1 g of 2-ethyl-1-hexanol, a urethane forming reaction was performed at 75° C. for 3 hours in a nitrogen stream, and thereby an isocyanate group-terminated urethane prepolymer II solution was obtained. The NCO content of this prepolymer was 0.9 mass %. An amine solution obtained by mixing 16 g of IPDA and 0.5 g of morpholine in advance was added to the resulting isocyanate group-terminated urethane prepolymer II solution, a chain extending reaction was performed at 40° C. for 4 hours, and thereby a polyurethane urea resin composition exhibiting. UV-absorption-agent resistance PU-5 was obtained. The number average molecular weight of the polyurethane urea resin composition exhibiting UV-absorption-agent resistance PU-5 was 80000, the molecular weight of 300000 or more in the molecular weight distribution was 9% in area ratio, and the viscosity at 25° C. was 11000 mPa·s.

Example 6

To a 4-neck flask having a volume of 2 liters and equipped with a stirrer, a thermometer, a heater, and a distillation column were fed 236 g of polyol 5, 350 g of DMF, and 350 g of MEK, nitrogen gas bubbling was performed while uniformly stirring these at 45° C., and a solution of a polymeric polyol was thus prepared. To this polymeric polyol solution was fed 49 g of a 2,4'-diphenylmethane diisocyanate/4,4'-diphenylmethane diisocyanate mixture (manufactured by Nippon Polyurethane industry Co., Ltd., trade name: Millionate NM, NCO content: 33.6 mass %, hereinafter referred to as MDI), a urethane forming reaction was performed at 75° C. for 3 hours in a nitrogen stream, and thereby an isocyanate group-terminated urethane prepolymer I solution was thus obtained. The NCO content of this prepolymer was 0.7 mass %.

To this isocyanate group-terminated urethane prepolymer I solution was fed 1 g of 2-ethyl-1-hexanol, a urethane forming reaction was performed at 75° C. for 3 hours in a nitrogen stream, and thereby an isocyanate group-terminated urethane prepolymer II solution was obtained. The NCO content of this prepolymer was 0.6 mass %. An amine solution obtained by mixing 13.5 g of IPDA and 0.5 g of MEA in advance was added to the resulting isocyanate group-terminated urethane prepolymer II solution, a chain extending reaction was performed at 40° C. for 4 hours, and thereby a polyurethane urea resin composition exhibiting UV-absorption-agent resistance PU-6 was obtained. The number average molecular weight of the polyurethane urea resin composition exhibiting UV-absorption-agent resistance PU-6 was 89000, the molecular weight of 300000 or more in the molecular weight distribution was 13% in area ratio, and the viscosity at 25° C. was 25000 mPa·s.

Example 7

To a 4-neck flask having a volume of 2 liters and equipped with a stirrer, a thermometer, a heater, and a distillation column were fed 231.5 g of polyol 4, 350 g of DMF, and 350 g of MEK, nitrogen gas bubbling was performed while uniformly stirring these at 45° C., and a solution of a polymeric polyol was thus prepared. To this polymeric polyol solution was fed 53 g of hydrogenated diphenylmethane diisocyanate (manufactured by Bayer, NCO content: 32.0 mass %, hereinafter referred to as hydrogenated MDI), a urethane forming reaction was performed at 75° C. for 3 hours in a nitrogen stream, and thereby an isocyanate group-terminated urethane prepolymer I solution was thus obtained. The NCO content of this prepolymer was 0.7 mass %.

To this isocyanate group terminated urethane prepolymer I solution was fed 1 g of 2-ethyl-1-hexanol, a urethane forming reaction was performed at 75° C. for 3 hours in a nitrogen stream, and thereby an isocyanate group-terminated urethane prepolymer II solution was obtained. The NCO content of this prepolymer was 0.7 mass %. An amine solution obtained by mixing 14 g of IPDA and 0.5 g of morpholine in advance was added to the resulting isocyanate group-terminated urethane prepolymer II solution, a chain extending reaction was performed at 40° C. for 4 hours, and thereby a polyurethane urea resin composition exhibiting UV-absorption-agent resistance PU-7 was obtained. The number average molecular weight of the polyurethane urea resin composition exhibiting UV-absorption-agent resistance PU-7 was 84000, the molecular weight of 300000 or more in the molecular weight distribution was 11% in area ratio, and the viscosity at 25° C. was 20000 mPa·s.

Example 8

To a 4-neck flask having a volume of 2 liters and equipped with a stirrer, a thermometer, a heater, and a distillation column were fed 216 g of polyol 6, 350 g of DMF, and 350 g of MEK, nitrogen gas bubbling was performed while uniformly stirring these at 45° C., and a solution of a polymeric polyol was thus prepared. To this polymeric polyol solution were fed 15 g of HDI and 50 g of IPDI, a urethane forming reaction was performed at 75° C., for 3 hours in a nitrogen stream, and thereby an isocyanate group-terminated urethane prepolymer I solution was obtained. The NCO content of this prepolymer was 1.5 mass %.

To this isocyanate group-terminated urethane prepolymer solution was fed 0.3 g of methanol, a urethane forming reaction was performed at 75° C. for 3 hours in a nitrogen stream, and thereby an isocyanate group-terminated urethane prepolymer II solution was obtained. The NCO content of this prepolymer was 1.4 mass %. An amine solution obtained by mixing 15 g of IPDA and 0.9 g of morpholine in advance was added to the resulting isocyanate group-terminated urethane prepolymer II solution, a chain extending reaction was performed at 40° C. for 4 hours, and thereby a polyurethane urea resin composition exhibiting UV-absorption-agent resistance PU-8 was obtained. The number average molecular weight of the polyurethane urea resin composition exhibiting UV-absorption-agent resistance PU-8 was 80000, the molecular weight of 300000 or more in the molecular weight distribution was 8% in area ratio, and the viscosity at 25° C. was 20000 mPa·s.

Example 9

To a 4-neck flask having a volume of 2 liters and equipped with a stirrer, a thermometer, a heater, and a distillation column were fed 153 g of polyol 2, 85 g of polyol 7, 350 g of DMF, and 350 g at MEK, nitrogen gas bubbling was performed while uniformly stirring these at 45° C., and a solution of a polymeric polyol was thus prepared. To this polymeric polyol solution was fed 48.5 g of IPDI, a urethane forming reaction was performed at 75° C. for 3 hours in a nitrogen stream, and thereby an isocyanate group-terminated urethane prepolymer I solution was obtained. The NCO content of this prepolymer was 0.7 mass %.

To this isocyanate group-terminated urethane prepolymer I solution was fed 0.5 g of n-butanol, a urethane forming reaction was performed at 75° C. for 3 hours in a nitrogen stream, and thereby an isocyanate group-terminated urethane prepolymer II solution was obtained. The NCO content of this prepolymer was 0.7 mass %. An amine solution obtained by mixing 12.5 g of IPDA and 0.5 g of morpholine in advance was added to the resulting isocyanate group-terminated urethane prepolymer II solution, a chain extending reaction was performed at 40° C. for 4 hours, and thereby a polyurethane urea resin composition exhibiting UV-absorption-agent resistance PU-9 was obtained. The number average molecular weight of the polyurethane urea resin composition exhibiting UV-absorption-agent resistance PU-9 was 78000, the molecular weight of 300000 or more in the molecular weight distribution was 8% in area ratio, and the viscosity at 25° C. was 10000 mPa·s.

Example 10

To a 4-neck flask having a volume of 2 liters and equipped with a stirrer, a thermometer, a heater, and a distillation column were fed 226 g of polyol 4, 350 g of DMF, and 350 g of MEK, nitrogen gas bubbling was performed while uniformly stirring these at 45° C., and a solution of a polymeric polyol was thus prepared. To this polymeric polyol solution was fed 52.2 g of IPDI, a urethane forming reaction was performed at 75° C. for 3 hours in a nitrogen stream, and thereby an isocyanate group-terminated urethane prepolymer I solution was obtained. The NCO content of this prepolymer was 1.1 mass %.

An amine solution obtained by mixing 21.3 g of IPDA and 0.5 g of morpholine in advance was added to this isocyanate group-terminated urethane prepolymer I solution, a chain extending reaction was performed at 40° C. for 4 hours, and thereby a polyurethane urea resin composition exhibiting UV-absorption-agent resistance PU-10 was obtained. The number average molecular weight of the polyurethane urea resin composition exhibiting UV-absorption-agent resistance PU-10 was 130000, the molecular weight of 300000 or more in the molecular weight distribution was 25% in area ratio, and the viscosity at 25° C. was 35000 mPa·s.

Comparative Example 1

To a 4-neck flask having a volume of 2 liters and equipped with a stirrer, a thermometer, a heater, and a distillation column were fed 148 g of polyol 6, 350 g of DMF, and 350 g of MEK, nitrogen gas bubbling was performed while uniformly stirring these at 45° C., and a solution of a polymeric polyol was thus prepared. To this polymeric polyol solution were fed 62 g of MDI and 55 g of IPDI, a urethane forming reaction was performed at 75° C. for 3 hours in a nitrogen stream, and thereby an isocyanate group-terminated urethane prepolymer I solution was obtained. The NCO content of this prepolymer was 3.5 mass %.

To this isocyanate group-terminated urethane prepolymer I solution was fed 35 g of 1,4-butanediol, a chain extending reaction was performed at 75° C., and thereby a polyurethane resin composition PU-11 was obtained. The number average molecular weight of the polyurethane resin composition PU-11 was 85000, the molecular weight of 300000 or more in the molecular weight distribution was 11% in area ratio, and the viscosity at 25° C. was 10000 mPa·s.

Comparative Example 2

To a 4-neck flask having a volume of 2 liters and equipped with a stirrer, a thermometer, a heater, and a distillation column were fed 260 g of polyol 1, 350 g of DMF, and 350 of MEK, nitrogen gas bubbling was performed while uniformly stirring these at 45° C., and a solution of a polymeric polyol was thus prepared. To this polymeric polyol solution were fed 13 g of MDI and 17 g of IPDI, a urethane forming reaction was performed at 75° C. for 3 hours in a nitrogen stream, and thereby an isocyanate group-terminated urethane prepolymer I solution was obtained. The NCO content of this prepolymer was 0.5 mass %.

To this isocyanate group-terminated urethane prepolymer I solution was fed 0.5 g of n-butanol, a urethane forming reaction was performed at 75° C. for 3 hours in a nitrogen stream, and thereby an isocyanate group-terminated urethane prepolymer II solution was obtained. The NCO content of this prepolymer was 0.5 mass %. An amine solution obtained by mixing 9 g of IPDA and 0.5 g of MEA in advance was added to the resulting isocyanate group terminated urethane prepolymer II solution, a chain extending reaction was performed at 40° C. for 4 hours, and thereby a polyurethane urea resin composition PU-12 was obtained. The number average molecular weight of the polyurethane urea resin composition PU-12 was 75000, the molecular weight of 300000 or more in the molecular weight distribution was 8% in area ratio, and the viscosity at 25° C. was 15000 mPa·s.

Comparative Example 3

To a 4-neck flask having a volume of 2 liters and equipped with a stirrer, a thermometer, a heater, and a distillation column were fed 196.5 g of polyol 2, 350 g of DMF, and 350 g of MEK, nitrogen gas bubbling was performed while uniformly stirring these at 45° C., and a solution of a polymeric polyol was thus prepared. To this polymeric polyol solution was fed 65 g of IPDI, a urethane forming reaction was performed at 75° C. for 3 hours in a nitrogen stream, and thereby an isocyanate group-terminated urethane prepolymer I solution was obtained. The NCO content of this prepolymer was 2.0 mass %.

To this isocyanate group-terminated urethane prepolymer I solution was fed 1.5 g of 2-ethyl-1-hexanol, a urethane forming reaction was performed at 75° C. for 3 hours in a nitrogen stream, and thereby an isocyanate group-terminated urethane prepolymer II solution was obtained. The NCO content of this prepolymer was 1.9 mass %. An amine solution obtained by mixing 36 g of IPDA and 1 g of MEA in advance was added to the resulting isocyanate group-terminated urethane prepolymer II solution, a chain extending reaction was performed at 40° C. for 4 hours, and thereby a polyurethane urea resin composition PU-13 was obtained. The number average molecular weight of the polyurethane urea resin composition PU-13 was 90000, the molecular weight of 300000 or more in the molecular weight distribution was 12% in area ratio, and the viscosity at 25° C. was 30000 mPa·s.

Comparative Example 4

To a 4-neck flask having a volume of 2 liters and equipped with a stirrer, a thermometer, a heater, and a distillation column were fed 239 g of polyol 6, 350 g of DMF, and 350 g of MEK, nitrogen gas bubbling was performed while uniformly stirring these at 45° C., and a solution of a polymeric polyol was thus prepared. To this polymeric polyol solution were fed 22 g of MDI and 29 g of IPDI, a urethane forming reaction was performed at 75° C. for 3 hours in a nitrogen stream, and thereby an isocyanate group-terminated urethane prepolymer I solution was obtained. The NCO content of this prepolymer was 0.5 mass %.

To this isocyanate group-terminated urethane prepolymer I solution was fed 0.9 g of n-butanol, a urethane forming reaction was performed at 75° C. for 3 hours in a nitrogen stream, and thereby an isocyanate group-terminated urethane prepolymer II solution was obtained. The NCO content of this prepolymer was 0.5 mass %. An amine solution obtained by mixing 8.4 g of IPDA and 0.7 g of MBA in advance was added to the resulting isocyanate group-terminated urethane prepolymer II solution, a chain extending reaction was performed at 40° C. for 4 hours, and thereby a polyurethane urea resin composition PU-14 was obtained. The number average molecular weight of the polyurethane urea resin composition PU-14 was 60000 the molecular weight of 300000 or more in the molecular weight distribution was 6% in area ratio, and the viscosity at 25° C. was 4000 mPa·s.

Comparative Example 5

To a 4-neck flask having a volume of 2 liters and equipped with a stirrer, a thermometer, a heater, and a distillation column were fed 194 g of polyol 7, 350 g of DMF, and 350 g of MEK, nitrogen gas bubbling was performed while uniformly stirring, these at 45° C., and a solution of a polymeric polyol was thus prepared. To this polymeric polyol solution were fed 31.5 g of HDI and 43 g of IPDI, a urethane forming reaction was performed at 75° C. for 3 hours in a nitrogen stream, and thereby an isocyanate group-terminated urethane prepolymer I solution was obtained. The NCO content of this prepolymer was 1.6 mass %.

To this isocyanate group-terminated urethane prepolymer I solution was fed 1 g of 2-ethyl-1-hexanol, a urethane forming reaction was performed at 75° C. for 3 hours in a nitrogen stream, and thereby an isocyanate group-terminated urethane prepolymer II solution was obtained. The NCO content of this prepolymer was 1.6 mass %. An amine solution obtained by mixing 30.0 g of IPDA and 0.5 g of MEA in advance was added to the resulting isocyanate group-terminated urethane prepolymer II solution, a chain extending reaction was performed at 40° C. for 4 hours, and thereby a polyurethane urea resin composition PU-15 was obtained. The number average molecular weight of the polyurethane urea resin composition PU-15 was 95000, the molecular weight of 300000 or more in the molecular weight distribution was 15% in area ratio, and the viscosity at 25° C. was 34000 mPa·s.

The amounts of the raw materials used in the polyurethane urea resin compositions exhibiting UV-absorption-agent resistance of PU-1 to PU-10, the polyurethane resin composition of PU-11, and the polyurethane urea resin compositions of PU-12 to PU-15, and characteristics are shown in Table 1 and Table 2.

TABLE 1

| Item | | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|---|
| | Name | PU-1 | PU-2 | PU-3 | PU-4 | PU-5 | PU-6 | PU-7 | PU-8 | PU-9 | PU-10 |
| Polyol (A) | Polyol 1 | 252 | | | | | | | | | |
| | Polyol 2 | | 250 | | | | | | | 153 | |
| | Polyol 3 | | | 250 | | | | | | | |
| | Polyol 4 | | | | 236 | | | | 231.5 | | 226 |
| | Polyol 5 | | | | | 233 | 236 | | | | |
| | Polyol 6 | | | | | | | | 216 | | |
| | Polyol 7 | | | | | | | | | 85 | |
| Polyisocyanate (B) | MDI | | | | | | | 49 | | | |
| | HDI | 13.5 | 5 | 5 | | | | | 15 | | |
| | IPDI | 17.5 | 30 | 30 | 47 | 50 | | | 50 | 48.5 | 52.2 |
| | Hydrogenated MDI | | | | | | | 53 | | | |
| Molecular weight modifier (C) | Methanol | | | | | | | | 0.3 | | |
| | n-Butanol | | 0.5 | 0.5 | | | | | | 0.5 | |
| | 2-Ethyl-1-hexanol | | | | 1 | 1 | 1 | 1 | | | |
| | 2-Tridecanol | 1.6 | | | | | | | | | |
| | MEA | 0.4 | | 0.5 | | | 0.5 | | | | |
| | Morpholine | | 0.5 | | 0.5 | 0.5 | | 0.5 | 0.9 | 0.5 | 0.5 |
| Diamine (D) | IPDA | 15 | 14 | 14 | 15.5 | 16 | 13.5 | 14 | 15 | 12.5 | 21.3 |
| Others | 1,4-Butanediol | | | | | | | | | | |
| Solvent | DMF | 350 | 350 | 350 | 350 | 350 | 350 | 350 | 350 | 350 | 350 |
| | MEK | 350 | 350 | 350 | 350 | 350 | 350 | 350 | 350 | 350 | 350 |
| | Total | 1000 | 1000 | 1000 | 1000 | 1000.5 | 1000 | 1000 | 997.2 | 1000 | 1000 |
| | Urethane group concentration (mmol/g) | 0.447 | 0.580 | 0.580 | 0.812 | 0.799 | 0.812 | 0.799 | 0.987 | 0.932 | 0.753 |
| | Urea group concentration (mmol/g) | 0.604 | 0.567 | 0.567 | 0.626 | 0.654 | 0.556 | 0.566 | 0.935 | 0.508 | 0.853 |
| | Urethane group concentration ratio (%) | 43 | 51 | 51 | 56 | 55 | 59 | 59 | 51 | 65 | 47 |
| Characteristics | Solid content (%) | 30 | 30 | 30 | 30 | 30 | 30 | 30 | 30 | 30 | 30 |
| | Viscosity (mPa·s at 25° C.) | 13,000 | 14,000 | 18,000 | 13,000 | 11,000 | 25,000 | 20,000 | 20,000 | 10,000 | 35,000 |
| | Number average molecular weight | 85,000 | 90,000 | 95,000 | 85,000 | 80,000 | 89,000 | 84,000 | 80,000 | 78,000 | 130,000 |
| | Area of molecular weight of 300000 or more (%) | 10 | 13 | 15 | 10 | 9 | 13 | 11 | 8 | 8 | 25 |

TABLE 2

| Item | | Comp. Ex. 1 | Comp. Ex. 2 | Comp. Ex. 3 | Comp. Ex. 4 | Comp. Ex. 5 |
|---|---|---|---|---|---|---|
| | Name | PU-11 | PU-12 | PU-13 | PU-14 | PU-15 |
| Polyol (A) | Polyol 1 | | 260 | | | |
| | Polyol 2 | | | 196.5 | | |
| | Polyol 3 | | | | | |
| | Polyol 4 | | | | | |
| | Polyol 5 | | | | | |
| | Polyol 6 | 148 | | | 239 | |
| | Polyol 7 | | | | | 194 |
| Polyisocyanate (B) | MDI | 62 | 13 | | 22 | |
| | HDI | | | | | 31.5 |
| | IPDI | 55 | 17 | 65 | 29 | 43 |
| | Hydrogenated MDI | | | | | |
| Molecular weight modifier (C) | Methanol | | | | | |
| | n-Butanol | | | 0.5 | 0.9 | |
| | 2-Ethyl-1-hexanol | | | | 1.5 | |
| | 2-Tridecanol | | | | | |
| | MEA | | | | 0.7 | |
| | Morpholine | | 0.5 | 1 | | 0.5 |
| Diamine (D) | IPDA | | 9 | 36 | 8.4 | 30 |
| Others | 1,4-Butanediol | 35 | | | | |
| Solvent | DMF | 350 | 350 | 350 | 350 | 350 |
| | MEK | 350 | 350 | 350 | 350 | 350 |
| | Total | 1000 | 1000 | 1000 | 1000 | 1000 |
| | Urethane group concentration (mmol/g) | 3.300 | 0.456 | 0.480 | 1.104 | 1.319 |
| | Urea group concentration (mmol/g) | 0.000 | 0.401 | 1.470 | 0.353 | 1.221 |

TABLE 2-continued

| Item | | Comp. Ex. 1 | Comp. Ex. 2 | Comp. Ex. 3 | Comp. Ex. 4 | Comp. Ex. 5 |
|---|---|---|---|---|---|---|
| Urethane group concentration ratio (%) | | 100 | 53 | 25 | 76 | 52 |
| Characteristics | Solid content (%) | 30 | 30 | 30 | 30 | 30 |
| | Viscosity (mPa · s at 25° C.) | 10,000 | 15 000 | 30,000 | 4,000 | 34,000 |
| | Number average molecular weight | 85,000 | 75,000 | 90,000 | 60,000 | 95,000 |
| | Area of molecular weight of 300000 or more (%) | 11 | 8 | 12 | 6 | 15 |

Abbreviations used in Examples, Comparative Examples, Table 1, and Table 2 are as follows.

(1) MDI: 2,4'-Diphenylmethane diisocyanate/4,4'-diphenylmethane diisocyanate mixture manufactured by Nippon Polyurethane Industry Co., Ltd., trade name: Millionate NM, NCO content: 33.6 mass %)
(2) HDI: Hexamethylene diisocyanate (manufactured by Nippon Polyurethane industry Co., Ltd., NCO content: 49.9 mass %)
(3) IPDI: Isophorone diisocyanate (manufactured by Evonik Japan Co., Ltd., NCO content: 37.8 mass %)
(4) Hydrogenated MDI: Hydrogenated diphenylmethane diisocyanate (manufactured by Bayer, NCO content: 32.0 mass %)
(5) Polyol 1: 1,6-Hexanediol-based polycarbonate polyol, number average molecular weight 4000, average number of functional groups 2
(6) Polyol 2: 1,6-Hexanediol-based polycarbonate polyol, number average molecular weight 3000, average number of functional groups 2
(7) Polyol 3: 1,4-Butanediol-adipic acid-based polyester polyol, number average molecular weight 3000, average number of functional groups 2
(8) Polyol 4: 1,6-Hexanediol-based polycarbonate polyol, number average molecular weight 2000, average number of functional groups 2
(9) Polyol 5: Copolymer polyol of 1,6-hexanediol-based polycarbonate polyol (number average molecular weight 2000) polycaprolactone polyol (number average molecular weight 2000)=mass ratio 7/3, number average molecular weight 2000, average number of functional groups 2
(10) Polyol 6: 1,6-Hexanediol-based polycarbonate polyol, number average molecular weight 1500, average number of functional groups 2
(11) Polyol 7: 1,6-Hexanediol-based polycarbonate polyol, number average molecular weight 1000, average number of functional groups 2
(12) MEA: Monoethanolamine
(13) IPDA: Isophoronediamine
(14) DMF: N,N-Dimethylformamide
(15) MEK; Methyl ethyl ketone
(16) Urethane group concentration ratio: Urethane group concentration×100/(Urethane group concentration+Urea group concentration)

<Preparation of Coating Material>

The resulting polyurethane urea resin compositions exhibiting UV-absorption-agent resistance PU-1 to PU-10, polyurethane resin composition PU-11, and polyurethane urea resin compositions PU-12 to PU-15 were applied with a bar coater to one surface of a biaxially stretched polyethylene terephthalate film (manufactured by Toyobo Co., Ltd., Ester Film E5100) having a thickness of 25 μm such that the thickness of the coating film after being dried was 50 μm, and dried at 120° C. for 10 minutes, and thereby coating materials were prepared.

Various properties of the resulting coating materials are shown in Table 3 to Table 4.

TABLE 3

| Item | | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|---|
| Wear resistance | | B | A | A | A | A | A | A | A | A | A |
| Oleic acid resistance | | A | A | A | A | A | A | A | A | A | A |
| UV-absorption-agent resistance | Compound a | A | A | A | A | A | A | A | A | A | A |
| | Compound b | A | AA | AA | AA | A | A | A | A | A | A |
| | Compound c | AA | AA | AA | AA | AA | AA | AA | A | AA | A |
| | Compound d | A | A | A | A | A | A | A | A | A | A |
| | Compound e | A | A | A | A | A | A | A | A | A | A |
| Tensile property | Strength at break (MPa) | 43 | 50 | 51 | 55 | 71 | 75 | 75 | 65 | 55 | 70 |
| | Elongation at break (%) | 600 | 550 | 600 | 500 | 490 | 450 | 450 | 540 | 500 | 450 |
| Heat resistance | Strength at break (MPa) | 41 | 48 | 35 | 54 | 65 | 71 | 74 | 64 | 52 | 70 |
| | Elongation at break (%) | 620 | 570 | 650 | 490 | 520 | 440 | 440 | 550 | 520 | 460 |
| Hydrolysis resistance | Strength at break (MPa) | 38 | 42 | 10 | 53 | 60 | 64 | 73 | 63 | 53 | 69 |
| | Elongation at break (%) | 630 | 610 | 720 | 520 | 520 | 470 | 440 | 540 | 540 | 450 |
| Weather resistance | Strength at break (MPa) | 36 | 43 | 15 | 45 | 50 | 5 | 73 | 68 | 46 | 60 |
| | Elongation at break (%) | 700 | 650 | 90 | 540 | 540 | 480 | 440 | 560 | 530 | 520 |

TABLE 4

| Item | | Comp. Ex. 1 | Comp. Ex. 2 | Comp. Ex. 3 | Comp. Ex. 4 | Comp. Ex. 5 |
|---|---|---|---|---|---|---|
| Wear resistance | | A | C | A | C | A |
| Oleic acid resistance | | A | B | A | B | A |
| UV-absorption-agent resistance | Compound a | B | C | B | C | B |
| | Compound b | B | C | B | C | B |
| | Compound c | B | C | B | C | B |
| | Compound d | B | C | B | C | B |
| | Compound e | B | C | B | C | B |
| Tensile property | Strength at break (MPa) | 65 | 20 | 68 | 25 | 50 |
| | Elongation at break (%) | 550 | 750 | 450 | 650 | 350 |
| Heat resistance | Strength at break (MPa) | 66 | 12 | 64 | 10 | 49 |
| | Elongation at break (%) | 570 | 850 | 430 | 720 | 360 |
| Hydrolysis resistance | Strength at break (MPa) | 63 | 8 | 67 | 15 | 47 |
| | Elongation at break (%) | 570 | 880 | 440 | 750 | 390 |
| Weather resistance | Strength at break (MPa) | 59 | 5 | 63 | 5 | 46 |
| | Elongation at break (%) | 600 | 1,000 | 480 | 1,200 | 380 |

Abbreviations used in Table 3 and. Table 4 are as follows.
(1) Compound a: 2-Hydroxy-4-methoxybenzophenone
(2) Compound b: 2-Ethylhexyl salicylate
(3) Compound c: 3,3,5-Trimethylcyclohexyl salicylate
(4) Compound d: 4-tert-Butyl benzoyl (4-methoxybenzoyl) methane
(5) Compound e: 2-Ethylhexyl 3,3-Di phenyl-2-cyanoacrylate As shown in Table 3 and Table 4, it was found that the coating materials according to Example 1 to Example 10 are excellent in various properties such as UV-absorption-agent resistance, oleic acid resistance, water resistance, stain resistance, and weather resistance. On the other hand, the coating materials of Comparative Example 1 to Comparative Example 5 were inferior in UV-absorption-agent resistance and heat resistance.

(1) Evaluation Test 1:
<Wear Resistance>
Wear characteristics were measured in accordance with JIS L1096 with a Taber abrader (manufactured by Yasuda Seiki Seisakusho Ltd.) at a load of 1 kg and a disk rotational speed of 60 rpm 500 rotations using an abrasive wheel H-22.
<Evaluation Criteria>
Coating film peeled or mostly worn away (Evaluation: C)
Coating film partially worn away (Evaluation: B)
No appearance change recognized (Evaluation: A)

(2) Evaluation Test 2:
<Oleic Acid Resistance>
Oleic acid was applied at 10 g/m² to the coating films, left to stand at 80° C. for 24 hours, and wiped off, and the appearance was visually evaluated.
<Evaluation Criteria>
Coating film partially to mostly dissolved (Evaluation: C)
Coating film mostly wrinkled (Evaluation: B)
Coating film slightly wrinkled (Evaluation: A)
Coating film showing no change (Evaluation: AA)

(4) Evaluation Test 4:
<UV-Absorption-Agent Resistance>
The following compounds were adjusted so as to be 3% in glycerin, the adjusted solution was applied at 10 g/m² to the coating films, left to stand at 80° C. for 24 hours, and wiped off, and the appearance was visually evaluated.
<Compounds>
(1) 2-Hydroxy-4-methoxybenzophenone
(2) 2-Ethylhexyl salicylate
(3) 3,3,5-Trimethylcyclohexyl salicylate
(4) 4-tert-Butylbenzoyl(4-methoxybenzoyl)methane
(5) 2-Ethylhexyl 3,3-diphenyl-2-cyanoacrylate
<Evaluation Criteria>
Coating film partially to mostly dissolved (Evaluation: C)
Coating film mostly wrinkled (Evaluation: B)
Coating film slightly wrinkled (Evaluation: A)
Coating film showing no change (Evaluation: AA)

(5) Evaluation Test 5:
<Tensile Properties>
The resin compositions PU-1 to PU-15 were cast onto release paper so as to have a thickness of 100 μm, left to stand still at normal temperature for 30 minutes, then heat-treated in a dryer at a temperature of 60° C. for 2 hours and at 120° C. for 2 hours, subsequently aged for 7 days in an environment having a temperature of 23° C. and a relative humidity of 50%, and thereby specimens were prepared. The tensile properties of the resulting specimens were measured in accordance with JIS K6251.
Test apparatus: Tensilon UTA-500) (manufactured by A&D Company Limited)
Measurement condition: 25° C.×50% RH
Head speed: 200 mm/min
Dumbbell: #4

(6) Evaluation Test 6:
<Heat Resistance>
The specimens prepared for tensile measurement were treated under the following conditions, and the tensile properties of Evaluation Test 5 were evaluated.
Treatment apparatus: Forced Convection Oven DRK633DA (manufactured by Advantec)
Treatment condition; 120° C., air circulated system
Treatment time: 500 hours (7) Evaluation Test 7
<Hydrolysis Resistance>
The specimens prepared for tensile measurement were treated under the following conditions, and the tensile properties of Evaluation Test 5 were evaluated.
Treatment apparatus: Thermo-Hygostat SH-220 (manufactured by Espec)
Treatment condition: 80° C.×95% RH
Test time: 500 hours (8) Evaluation Test 8
<Weather Resistance>
The specimens prepared for tensile measurement were treated under the following conditions, and the tensile properties of Evaluation Test 5 were evaluated.
Treatment apparatus: QUV (manufactured by Q-LAB)
Lamp: EL-313
Illuminance: 0.59 w/m²
λmax: 313 mm
One cycle: 12 hours [UV irradiation: 8 hours (temperature 70° C.), condensation: 4 hours (temperature 50° C.)]
Treatment time: 720 hours Although the present invention has been described in detail and in reference to specific embodiments, it is clear to those skilled in the art that various changes and modifications can be made without departing from the nature and scope of the present invention.

The entire content of the specification, claims, drawings, and abstract of Japanese Patent Application No. 2014-139980 filed on Jul. 7, 2014 is incorporated herein by reference as the disclosure of the specification of the present invention.

The invention claimed is:

1. A polyurethane urea resin composition having UV-absorption-agent resistance, comprising:
   an organic solvent; and
   a polyurethane urea resin dissolved in the organic solvent and comprising a monomer unit derived from a polyol, a monomer unit derived from a polyisocyanate, a monomer unit derived from a molecular weight modifier, and a monomer unit derived from a diamine, and the polyurethane urea resin has a urea group concentration in a range of 0.5 to 1 mmol/g, a urethane group concentration of 1 mmol/g or less, and a urethane group concentration ratio in a range of 40 to 59% where the urethane group concentration ratio=the urethane group concentration×100/(the urethane group concentration+the urea group concentration).

2. The polyurethane urea resin composition according to claim 1, wherein the polyisocyanate is an alicyclic diisocyanate, and the molecular weight modifier is at least one selected from the group consisting of a $C_{1-20}$ end-capping alcohol and a $C_{1-20}$ end-capping amine.

3. The polyurethane urea resin composition according to claim 1, wherein the polyurethane urea resin has a number average molecular weight of 60000 to 100000 based on gel permeation chromatography, and a molecular weight of 300000 or more in a molecular weight distribution is 20% or less in area ratio.

4. A method for producing a polyurethane urea resin composition having UV-absorption-agent resistance, comprising:
   reacting a polyol, a polyisocyanate, a molecular weight modifier, and a diamine such that a polyurethane urea resin composition comprising an organic solvent and a polyurethane urea resin dissolved in the organic solvent is obtained,
   wherein the polyurethane urea resin has a urea group concentration in a range of 0.5 to 1 mmol/g, a urethane group concentration of 1 mmol/g or less, and a urethane group concentration ratio in a range of 40 to 59% where the urethane group concentration ratio=the urethane group concentration×100/(the urethane group concentration+the urea group concentration).

5. The method according to claim 4, wherein the reacting of the polyol, the polyisocyanate, the molecular weight modifier, and the diamine comprises producing an isocyanate group-terminated prepolymer I by feeding the polyol and the polyisocyanate in amounts such that an isocyanate group is in an excessive amount, and performing a urethane forming reaction, producing an isocyanate group-terminated prepolymer II by reacting the isocyanate group-terminated prepolymer I and the molecular weight modifier, and performing a urea forming reaction of the isocyanate group-terminated prepolymer II, the diamine, and optionally the molecular weight modifier.

6. A molding body produced by molding the polyurethane urea resin composition of claim 1.

7. A coating material produced by coating the polyurethane urea resin composition of claim 1 onto a substrate.

8. The polyurethane urea resin composition according to claim 1, wherein the molecular weight modifier is at least one selected from the group consisting of a $C_{1-20}$ end-capping monoalcohol having a side chain and a $C_{1-20}$ end-capping amine.

9. The polyurethane urea resin composition according to claim 1, wherein the molecular weight modifier is at least one selected from the group consisting of 2-ethyl-1-hexanol and a $C_{1-20}$ end-capping amine.

10. The polyurethane urea resin composition according to claim 1, wherein the molecular weight modifier is a $C_{1-20}$ end-capping monoalcohol having a side chain.

11. The polyurethane urea resin composition according to claim 1, wherein a viscosity of the polyurethane urea resin composition is in a range from 5000 to 25000 mPa·s.

12. The method according to claim 4, wherein the polyisocyanate is an alicyclic diisocyanate, and the molecular weight modifier is at least one selected from the group consisting of a $C_{1-20}$ end-capping alcohol and a $C_{1-20}$ end-capping amine.

13. The method according to claim 4, wherein the polyurethane urea resin has a number average molecular weight of 60000 to 100000 based on gel permeation chromatography, and a molecular weight of 300000 or more in a molecular weight distribution is 20% or less in area ratio.

14. The method according to claim 4, wherein the molecular weight modifier is at least one selected from the group consisting of a $C_{1-20}$ end-capping monoalcohol having a side chain and a $C_{1-20}$ end-capping amine.

15. The method according to claim 4, wherein the molecular weight modifier is at least one selected from the group consisting of 2-ethyl-1-hexanol and a $C_{1-20}$ end-capping amine.

16. The method according to claim 4, wherein the molecular weight modifier is a $C_{1-20}$ end-capping monoalcohol having a side chain.

17. The method according to claim 4, wherein a viscosity of the polyurethane urea resin composition is in a range from 5000 to 25000 mPa·s.

18. The polyurethane urea resin composition according to claim 3, wherein the polyisocyanate is an alicyclic diisocyanate, and the molecular weight modifier is at least one selected from the group consisting of a $C_{1-20}$ end-capping alcohol and a $C_{1-20}$ end-capping amine.

19. The polyurethane urea resin composition according to claim 3, wherein the molecular weight modifier is at least one selected from the group consisting of a $C_{1-20}$ end-capping monoalcohol having a side chain and a $C_{1-20}$ end-capping amine.

20. The polyurethane urea resin composition according to claim 3, wherein the molecular weight modifier is at least one selected from the group consisting of 2-ethyl-1-hexanol and a $C_{1-20}$ end-capping amine.

* * * * *